United States Patent [19]

Wood

[11] 4,361,974
[45] Dec. 7, 1982

[54] UNIVERSAL DENTAL RADIOGRAPHIC FILM HOLDER

[76] Inventor: Nelson Wood, 1819 Beacon St., Brookline, Mass. 02146

[21] Appl. No.: 266,204

[22] Filed: May 22, 1981

[51] Int. Cl.³ .............................................. G09F 1/10
[52] U.S. Cl. .................................. 40/158 B; 40/405; 40/537
[58] Field of Search ............... 40/158, 158 B, 158 BL, 40/405, 537

[56] References Cited

U.S. PATENT DOCUMENTS 1,261,133  4/1918  Kidd .................................. 40/158 R
2,701,426  2/1955  Vlock .................................... 40/159
4,132,426  1/1979  Reed .................................. 40/158 B Primary Examiner—Gene Mancene
Assistant Examiner—Wenceslao J. Contreras
Attorney, Agent, or Firm—Kenway & Jenney

[57] ABSTRACT

Dental radiographic film holder in one embodiment comprising two sheets with aligned openings and detachable portions adjacent the openings, to be detached to form larger openings for larger films. The openings in the back sheet include widened edge portions for insertion of film into the holder. In another embodiment a single sheet has first front and back, spaced apart, sheet portion to form slots to receive films, sections of the sheet portions being detachable to form a larger opening that is bounded at least in part by second, spaced apart, front and back sheet portions.

5 Claims, 9 Drawing Figures

UNIVERSAL DENTAL RADIOGRAPHIC FILM HOLDER

BACKGROUND

This invention relates generally to dental radiographic film holders and particularly to holders adaptable to different size films.

X-rays in dental practice typically result in a number of developed films for a patient. The film format is generally small, and for convenience of storage and ease of viewing, the developed films are mounted on cardboard or plastic holders. The holders have openings through which light can pass for viewing the x-ray film held in the openings. One form of mounting the films is to provide two sheets of cardboard or plastic with generally aligned openings of a size slightly smaller than the films to be held. The sheets are adhered together, and the films are slid into the openings between the sheets through a widened edge of the opening. The films are held in place by the edges of the sheets that surround the opening and capture the edges of the films.

Dental x-ray films come in different sizes, however. Typically, they are size 0 (pedodontic), size 1 (anterior periapical) and size 2 (posterior periapical). One size film cannot be inserted into openings meant for another size. Accordingly, many dental radiographic film holders have a number of openings for different sizes of films. If the collection of films in a particular case does not correspond in sizes to the openings on a card, however, some of the openings will be unusable. If a holder has only one opening, it can be used for only one size film, and cannot be used for others.

Accordingly, it is an object of the invention to provide a universal dental radiographic film holder that may be used to accommodate a range of film sizes. It is another object to provide such a holder that is simple and inexpensive to manufacture and convenient to use.

SUMMARY OF THE INVENTION

The invention features a dental radiographic film holder comprising a substantially planar means defining a first substantially rectangular opening for viewing an inserted radiographic film, the planar means including a first front sheet portion bordering at least a portion of the first opening and a first back sheet portion bordering at least a portion of the first opening, the first front and back portions being substantially parallel and spaced apart in a direction perpendicular to the planar means, and sections of the portions being detachably connected to the planar means to form a second, larger, opening when the sections are detached. The planar means also comprises a second front sheet portion and a second back sheet portion, each bordering at least a portion of the second opening, and the sections being substantially parallel and spaced apart in a direction perpendicular to the plane means.

In a preferred embodiment a dental radiographic film holder features two sheets mounted adjacent each other, a front sheet defining a first front opening and a detachable section adjacent the first opening, which may be detached to form a second larger front opening encompassing the first, and a back sheet defining a first back opening substantially aligned with the first front opening and a detachable section adjacent the first back opening, which may be detached to form a second larger back opening encompassing the first back opening, the first back opening including an edge portion wider than the remainder of the opening for insertion of a radiographic film between the sheets.

The invention also features the detachable section of the front sheet and the detachable section of the back sheet being substantially aligned; the detachable sections bordering edges of the openings that are not the wider edge; the detachable section on said back sheet selected so that after it is detached, the second back opening includes an edge portion wider than the remainder of the second back opening.

BRIEF DESCRIPTION OF THE DRAWING

Other objects, features and advantages of the invention will be described in the following description of a preferred embodiment of the invention, including the drawing thereof, in which.

DESCRIPTION OF A PREFERRED EMBODIMENT

Figure 1:
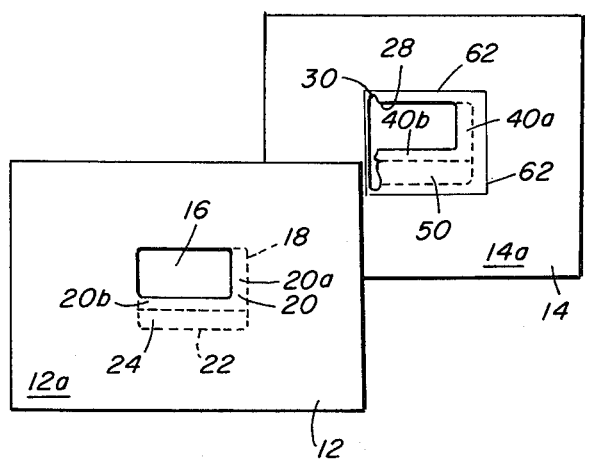
FIG. 1 is a view from the front of the two sheets making up a holder constructed according to the invention, slightly separated.

As shown in FIG. 1, the dental radiographic film holder 10 is made up of two cardboard sheets, a front sheet 12 for viewing radiographic pictures, and a back sheet 14 for inserting film into the holder 10. The holder 10 of the preferred embodiment is meant to hold only one radiographic film (though, in accordance with the invention, the film could be of different sizes). This is partly for convenience of illustration and partly because such one film holders are also useful: if the holder can hold a film of any three different sizes, the inventory of holders that a dentist must have will diminish. A holder may, however, have openings for many films, each holder opening adjustable to accommodate different size films, so that no opening need be unused because it is the wrong size.

In the view of FIG. 1, the front surface 12a of the front sheet 12, and the front surface 14a of the back sheet 14, are visible. The front sheet 12 has a first, substantially rectangular, opening 16 for viewing an exposed (also substantially rectangular) radiographic film placed behind the opening 16, between the sheets 12, 14 in their joined position. The first front opening 16 is appropriate for viewing size 0 film; that is, its width is slightly narrower than the width of a size 0 film.

Figure 5:
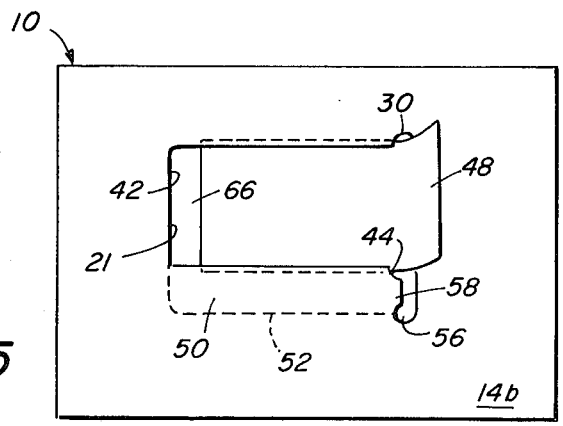
FIG. 5 is a view like FIG. 3, with a portion of the holder detached to create a larger opening, and a film larger than the one in FIG. 3 being inserted.

The front sheet 12 includes perforations 18 defining a first front detachable section 20, adjacent the bottom and one side of the first front opening 16. The perforations 18 allow the section 20 to be detached from the sheet 12 by hand. Actually, the first front detachable section 20 is divided into two sections, a side section 20a and a bottom section 20b, for ease of detachment. When the sections 20a and 20b are removed, a second larger front opening 21 (see FIG. 5) is created in the front sheet 12. This second larger opening 21, encompassing the first front opening 16, is appropriate for viewing size 1 film (its width is slightly less than the width of size 1 film).

Finally, the first sheet 12 includes a further set of perforations 22 defining a second front detachable section 24 adjacent the first front detachable section 20. This second front detachable section 24 may also be detached by hand along the perforations 22 to create a third front opening 26 (see FIG. 6), encompassing the second front opening 21. The third front opening 26 is suitable for viewing size 2 film.

Figure 2A:
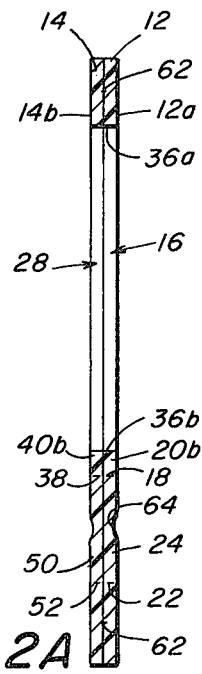
FIG. 2A is a sectional view, along the line 2A—2A, of the holder of FIG. 2.
Figure 2:
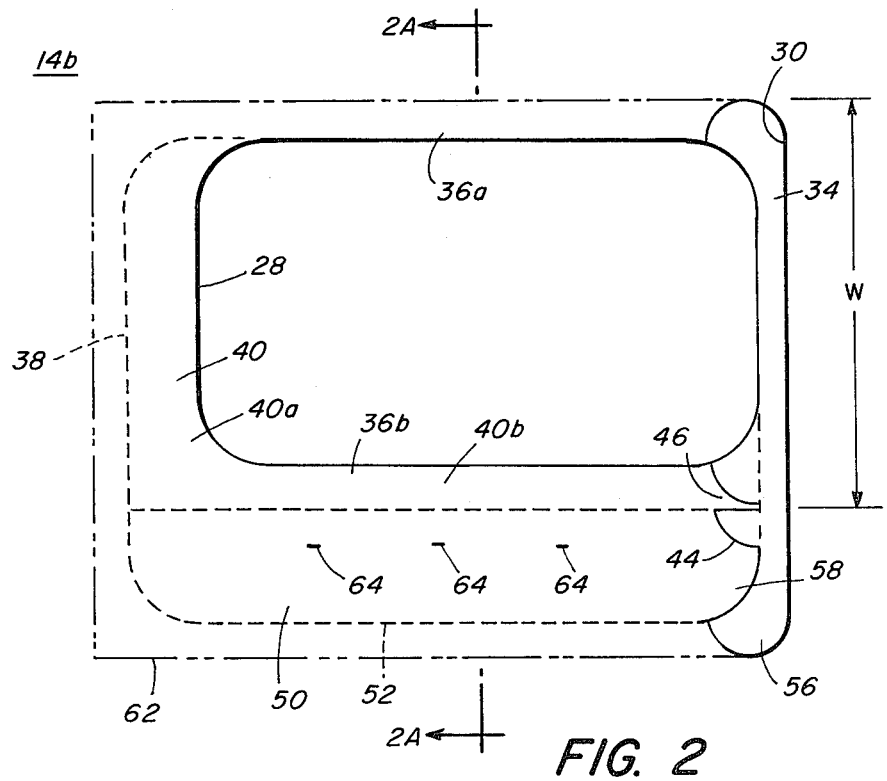
FIG. 2 is a view from the back of the portion of the assembled holder surrounding the opening.

The front surface 14a of the back sheet 14 is shown in FIG. 1, and the back surface 14b of the back sheet 14 in FIG. 2. When assembled, the holder 10 is made up of the front sheet 12 and the back sheet 14 joined together, their peripheral edges aligned. The back sheet 14, as shown in FIG. 2, has a generally rectangular first back opening 28 corresponding to the first front opening 16 in the front sheet 12. The width of the first back opening 18 is slightly less than the width of a size 0 film. In addition, however, the opening 28 in the back sheet 14 includes a widened section 30 at one edge, the width (designated by w, in FIG. 2) of the widened section 30 being slightly greater than the width of size 0 radiographic film, so that a film 32 can be inserted through the widened section 30 to the space between the two sheets 12 and 14 (see FIG. 3). For ease of guiding a film 32 into the space between the sheets of the holder 10, a portion 34 of the front sheet 12 defining the edge 36 of the first front opening 16 is exposed by the widened section 30 of the first back opening 28. The edges 32a, b of the size 0 film are captured between the edge portions 36a, b of the front and back sheets 12, 14 defining the top and bottom of the opening for the picture.

The back sheet 14 includes perforations 38 forming a first back detachable section 40 adjacent the bottom and side (opposite the widened section 30) of the first back opening 28. The perforations 38 allow detachment of the detachable section 40 by hand. As in the case of the corresponding detachable section in the front sheet 12, the back detachable section 40 is also divided into a side section 40a and a bottom section 40b by the perforations 38 for ease of detachment. When the sections 40a and 40b are removed (typically together with the corresponding sections 20a and 20b of the front sheet 12), a second larger back opening 42 is formed, which encompasses the first back opening 28, and corresponds to the second front opening 21 in the front sheet 12. In addition, a cut out portion 44 in the back sheet 14, below the end 46 of the first back detached bottom section 40b, extends the widened section 30 so that it is wider than the width of a size 1 radiographic film 48, allowing the film to be inserted into the space between the holder sheets (see FIG. 5).

A second back detachable section 50, defined by another set of perforations 52, adjacent the first back detachable section 40, is detachable by hand to create a third back opening 54. The second back detachable section 50 corresponds to the front detachable section 24 of the front sheet 12 (and would typically be removed, or detached, with it), so that the third back opening 54 in the back sheet 14 corresponds generally to the third front opening 26 in front sheet 12. In addition, however, a second cut out portion 56 in the back sheet 14, below the end 58 of the second back detached section 50 extends the widened edge 30 so that it is wider than the width of a size 2 radiographic film 60, so that the film may be inserted into the space between the holder sheets (see FIG. 6).

The sheets 12, 14 of the holder 10 are joined together by a conventional adhesive applied to an area outside a line 62 drawn a distance away from the perimeter of the detachable portions on both sheets, so as not to interfere with the insertion of radiographic film between the sheets 12, 14. The detachable portions 24, 50 of the front and back sheets 12, 14 respectively, are crimped together at several spots 64 to provide an enclosure for the small first front opening 16 (and corresponding first back opening 28) in the holder 10.

Figure 3:
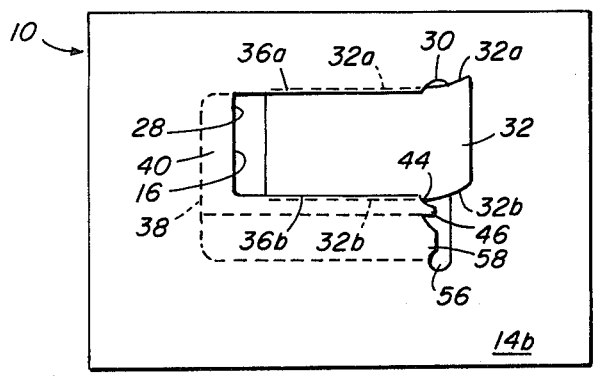
FIG. 3 is a view from the back of the holder with the smallest radiographic film being inserted.
Figure 4:
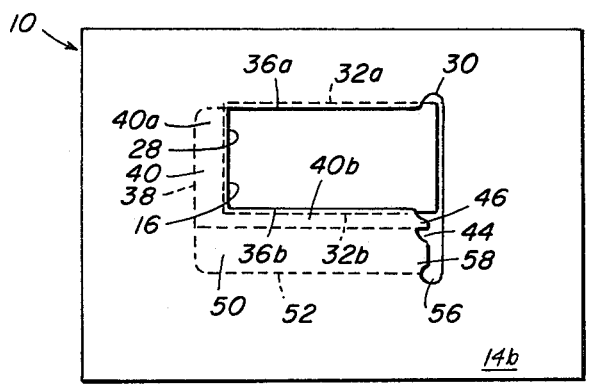
FIG. 4 is a view of the holder like that of FIG. 3, with the film fully inserted.

In use, as seen in FIG. 3 and 4, the smallest opening 16 of the holder 10 is used as is, by inserting a size 0 film 32 into the widened edge portion 30 and sliding it between the sheet 12, 14 (see FIG. 3), so that the edges of the film 32 are captured between the sheets, until the entire film 32 is fully inserted (see FIG. 4).

If it is desired to mount the next larger size film, the detachable sections 20 and 40 next adjacent the openings are removed by hand, leaving a larger "window" 66 for the next size film. The cut out portion 44 below the detachable section 40 on the back sheet 14 leaves a widened edge for a size 1 film 48. The size 1 film 48 may then be inserted (see FIG. 5) into the holder 10.

Figure 6:
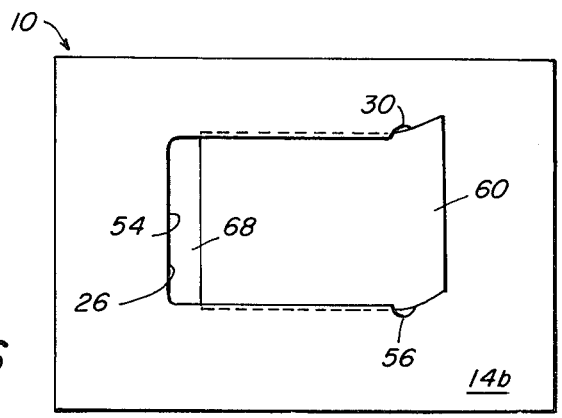
FIG. 6 is a view like FIG. 5, with the opening enlarged again and a still larger film being inserted.

Similarly, a size 2 film 60 may be inserted into the window 68 created by detaching the next detachable sections 24 and 50 of the front and back sheets 12, 14, through the widened edge including the second cut out portion 56 of the back sheet below the detachable section 50 (see FIG. 6).

Thus, a single holder 10 is adaptable to at least three different film sizes by virtue of the detachable sections. The widened edge entrance slot for each of the films is preserved by having the detachable sections adjacent other edges of the openings.

Figure 7:
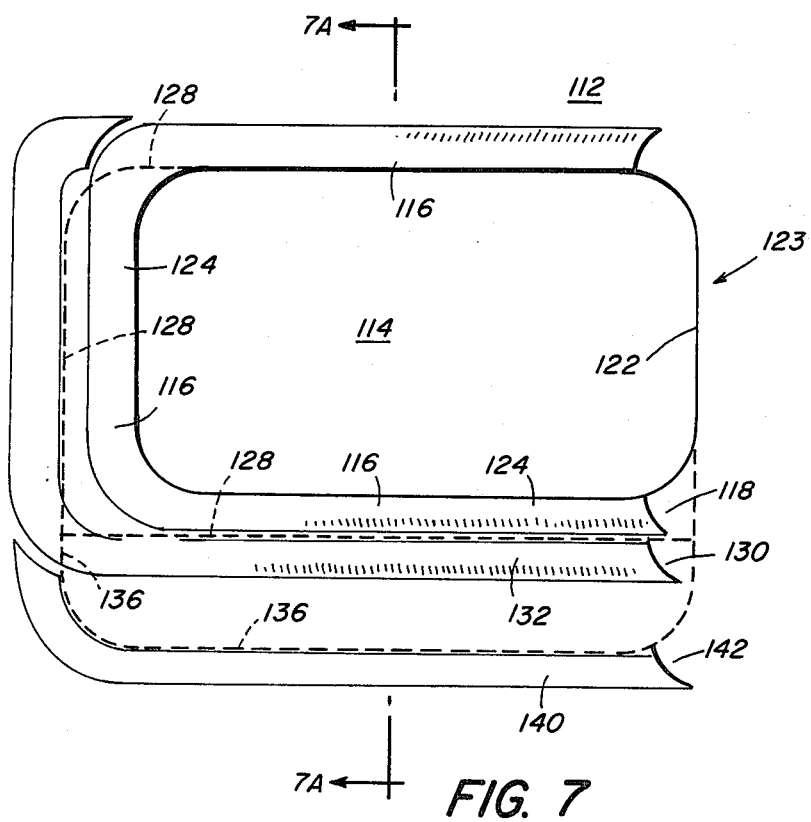
FIG. 7 is a view like FIG. 2 of an alternative embodiment of the invention.
Figure 7A:
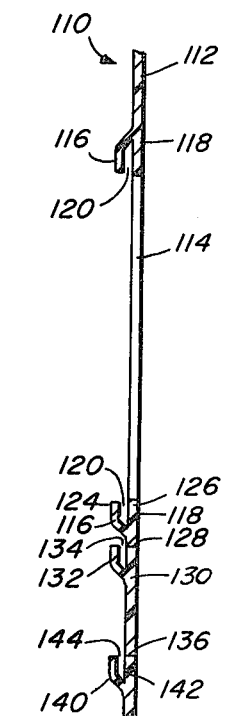
FIG. 7A is a sectional view, along the line 7A—7A, of the holder of FIG. 7.

An alternative embodiment of a universal radiographic film holder is shown in FIGS. 7 and 7A. The film holder 110 of this embodiment is made from a more rigid material, such as plastic, in which, rather than two sheets, the large planar portion 112 of the film holder is a single sheet.

The large plane sheet 112 initially defines a substantially rectangular opening 114 of the same general configuration as that shown in the first embodiment, for viewing an inserted radiographic film. A first back sheet portion 116 borders the first opening 114 on one side. A first front sheet portion 118 is substantially parallel to the first back sheet portion 116, and spaced apart from it (in a direction perpendicular to the large plane sheet) to form a slot 120 for the edges of the radiographic film inserted into the opening 114.

The slot 120 completely borders the first opening 114 except that, to allow the insertion of the film, the back sheet portion 116 borders the first opening 114 incompletely, that is, it is eliminated along an edge 122 of the rectangular opening, to form a gap 123 that is wider than the width of the opening 114. This allows the insertion of the film between the first back 116 and front 118 sheet portions.

Sections 124 and 126, respectively, of the back 116 and front 118 sheet portions are detachable from the large planar sheet 112. A series of perforations 128 beneath and to one side of the first back 116 and front 118 sheet portions allows their detachment by hand, and the creation of a second, larger opening.

A second front portion 130 and a second back 132 portion, having the same parallel, spaced apart relationship as the first portions 116, 118 border the second opening on the bottom and side, merging with the remaining undetached sections of the first front 118 and back 116 sheet portions to form a second slot 134 bordering the second opening. As is the case of the first opening, the second back sheet portion 132 is eliminated for a portion along an edge of the second rectangular opening to allow insertion of a radiographic film a size larger than the one that is insertable into the first opening 114. The second front 130 and back 132 sheet portions are detachable from the large planar sheet 112 along a second series of perforations 136 to form a third opening for a still larger size film.

Third front 140 and back 142 sheet portions, having the same parallel and spaced apart relationship, border parts of the sides and bottom of the third opening to help form a third slot 144 bordering the third opening.

Other alterations, additions, and modifications to the illustrated preferred embodiments described above may be made by those skilled in the art without departing from the invention, whose scope is limited only by the following claims:

What is claimed is:

1. A dental radiographic film holder, comprising
a substantially planar means, said planar means defining
 a first substantially rectangular opening for viewing an inserted radiographic film,
 said first substantially rectangular opening including a widened edge entrance opening,
 said planar means comprising
  a first front sheet portion bordering at least a portion of said first opening,
  a first back sheet portion bordering at least a portion of said first opening,
   said first front and back sheet portions being substantially parallel, and spaced apart in a direction perpendicular to said planar means,
   sections of said first front and back sheet portions remote from said widened edge entrance opening being detachably connected to said planar means to form a second, larger, opening when said first front and first back sections are detached.
  a second front sheet portion bordering at least a portion of said second opening, and
  a second back sheet portion bordering at least a portion of said second opening,
   said second front and back sheet portions being substantially parallel, and spaced apart in a direction perpendicular to said planar means.

2. The dental radiographic film holder of claim 1 in which one of said first front and back sheet portions incompletely borders said first opening to form a gap wider than the width of one of the sides of said first substantially rectangular first opening, to allow insertion of a radiographic film between said first front and back sheet portions.

3. A dental radiographic film holder, comprising front and back sheets mounted adjacent each other,
 said front sheet defining a first front opening and having a detachable section adjacent the first front opening, detachable to form a second front opening encompassing said first opening,
 said back sheet defining a first back opening substantially aligned with said first front opening, detachable to form a second back opening encompassing said first back opening,
  said second back opening including an edge portion wider than the remainder of the opening, for insertion of a radiographic film between the sheets,
  said detachable sections being adjacent edges of said first front and first back opening that are remote from said widened edge.

4. The holder of claim 3 in which said first back opening uncovers a portion of said front sheet defining an edge of said first front opening adjacent said widened edge.

5. The holder of claim 3 in which said second back opening includes an edge portion wider than the remainder of said second back opening.

* * * * *